(12) United States Patent
Kritt et al.

(10) Patent No.: US 8,548,973 B1
(45) Date of Patent: Oct. 1, 2013

(54) METHOD AND APPARATUS FOR FILTERING SEARCH RESULTS

(75) Inventors: Barry A. Kritt, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/472,161

(22) Filed: May 15, 2012

(51) Int. Cl.
*G06F 17/30* (2006.01)

(52) U.S. Cl.
USPC ............................ 707/706; 707/754; 707/769

(58) Field of Classification Search
USPC ................. 707/706, 723, 727, 728, 755, 754, 707/765, 766, 769, 770
See application file for complete search history.

(56) References Cited

U.S. PATENT DOCUMENTS

| | | | |
|---|---|---|---|
| 6,012,053 A * | 1/2000 | Pant et al. ............................... | 1/1 |
| 6,028,605 A | 2/2000 | Conrad et al. | |
| 6,944,612 B2 * | 9/2005 | Roustant et al. .............. | 707/706 |
| 7,725,422 B2 * | 5/2010 | Ryan et al. .................... | 707/709 |
| 7,899,833 B2 * | 3/2011 | Stevens et al. ................ | 707/754 |
| 7,953,593 B2 | 5/2011 | Marchisio et al. | |
| 8,010,904 B2 | 8/2011 | Prabhu | |
| 8,037,041 B2 | 10/2011 | Gupta | |
| 2004/0177015 A1 * | 9/2004 | Galai et al. ....................... | 705/35 |
| 2006/0224587 A1 * | 10/2006 | Zamir et al. ....................... | 707/7 |
| 2008/0270451 A1 * | 10/2008 | Thomsen et al. ............. | 707/102 |
| 2009/0119288 A1 * | 5/2009 | Sagoo et al. ....................... | 707/5 |
| 2009/0125482 A1 | 5/2009 | Peregrine et al. | |
| 2009/0164425 A1 | 6/2009 | Olston et al. | |
| 2009/0281994 A1 | 11/2009 | Byron | |
| 2009/0292681 A1 * | 11/2009 | Wood et al. ....................... | 707/3 |
| 2009/0327223 A1 * | 12/2009 | Chakrabarti et al. ............. | 707/3 |
| 2010/0131491 A1 | 5/2010 | Lemaire et al. | |
| 2010/0185604 A1 | 7/2010 | Keohane et al. | |
| 2010/0268702 A1 | 10/2010 | Wissner et al. | |
| 2011/0119261 A1 | 5/2011 | Qiao | |
| 2011/0137882 A1 | 6/2011 | Weerasinghe | |
| 2011/0196875 A1 | 8/2011 | Vadlamani et al. | |

OTHER PUBLICATIONS

Mark Klinchin, "How to Use Sharepoint Metadata to Improve Search and Control Content", Metavis Technologies, Jan. 2010, pp. 1-19.*
Masunaga et al.; "SERPWatcher: A Sophisticated Mining Tool Utilizing Search Engine . . . Social Change Discovery", IEEE 2nd Inter. Conf. on, Aug. 20-22, 2010, pp. 465-472.
Marcialis et al.; "Searchy: An Agent to Personalized Search Results", ICIW IEEE 3rd International Conference on, Jun. 8-13, 2008, pp. 512-517.
IBM et al.; "Search Engines Providing Additional Search Results Based on Users Configuration", IPCOM000199904D, Sep. 21, 2010.
IBM et al.; "Metata Driven Report Parameter Screens", IPCOM000014927D, Aug. 1, 2001.

* cited by examiner

*Primary Examiner* — John E Breene
*Assistant Examiner* — Nargis Sultana
(74) *Attorney, Agent, or Firm* — Kunzler Law Group

(57) ABSTRACT

A method, apparatus, and computer program product for filtering search results is disclosed herein. A method for filtering search results may extract metadata attributes and associated attribute values from web search results. The method includes presenting the extracted metadata attributes to a user for selection by the user and receiving input from the user indicating a selected metadata attribute. The method includes presenting attribute values associated with the selected metadata attribute to the user for selection by the user and receiving input from the user indicating a selected attribute value. The method includes filtering the web search results based on the selected attribute value. Each entry in the filtered web search results includes the selected attribute value. The method includes displaying a filtered results list to the user where the filtered results list includes the filtered web search results.

17 Claims, 8 Drawing Sheets

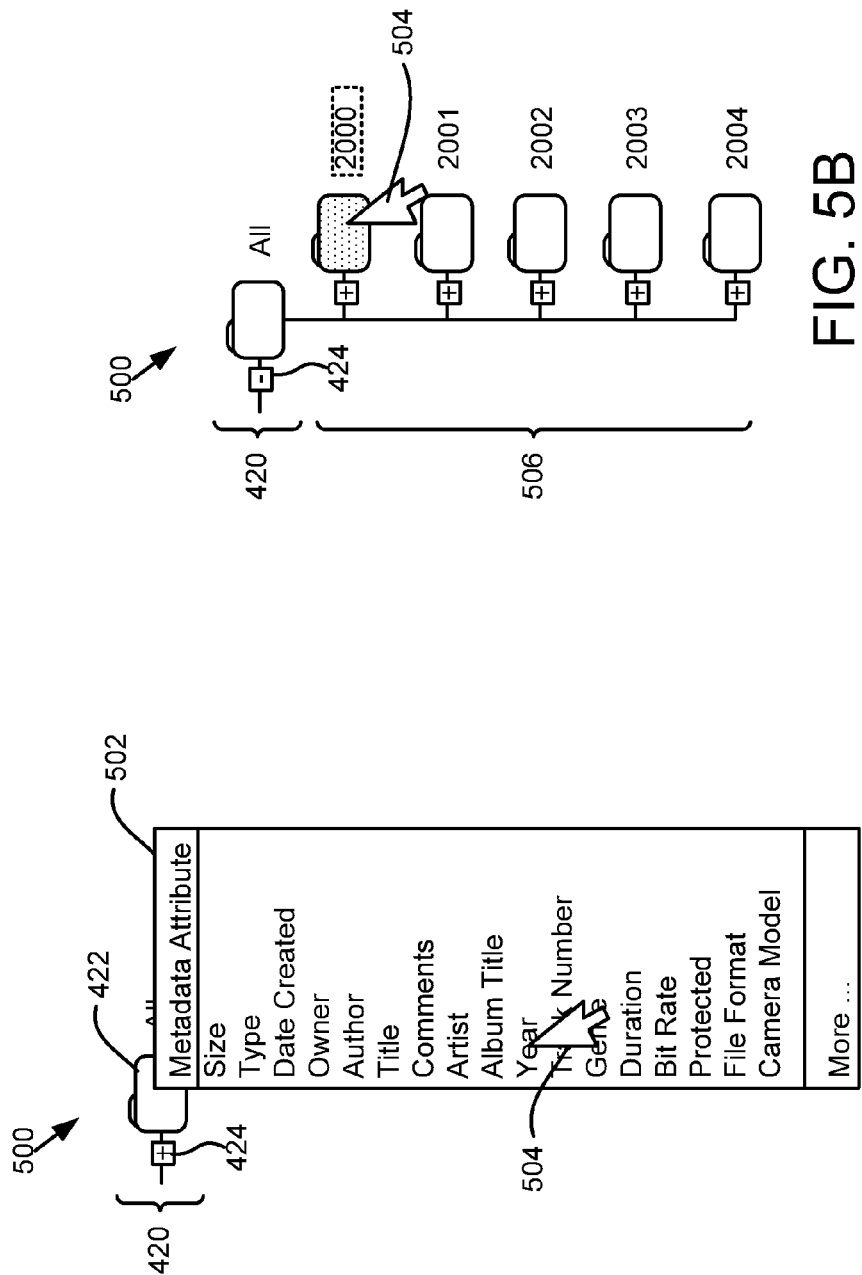

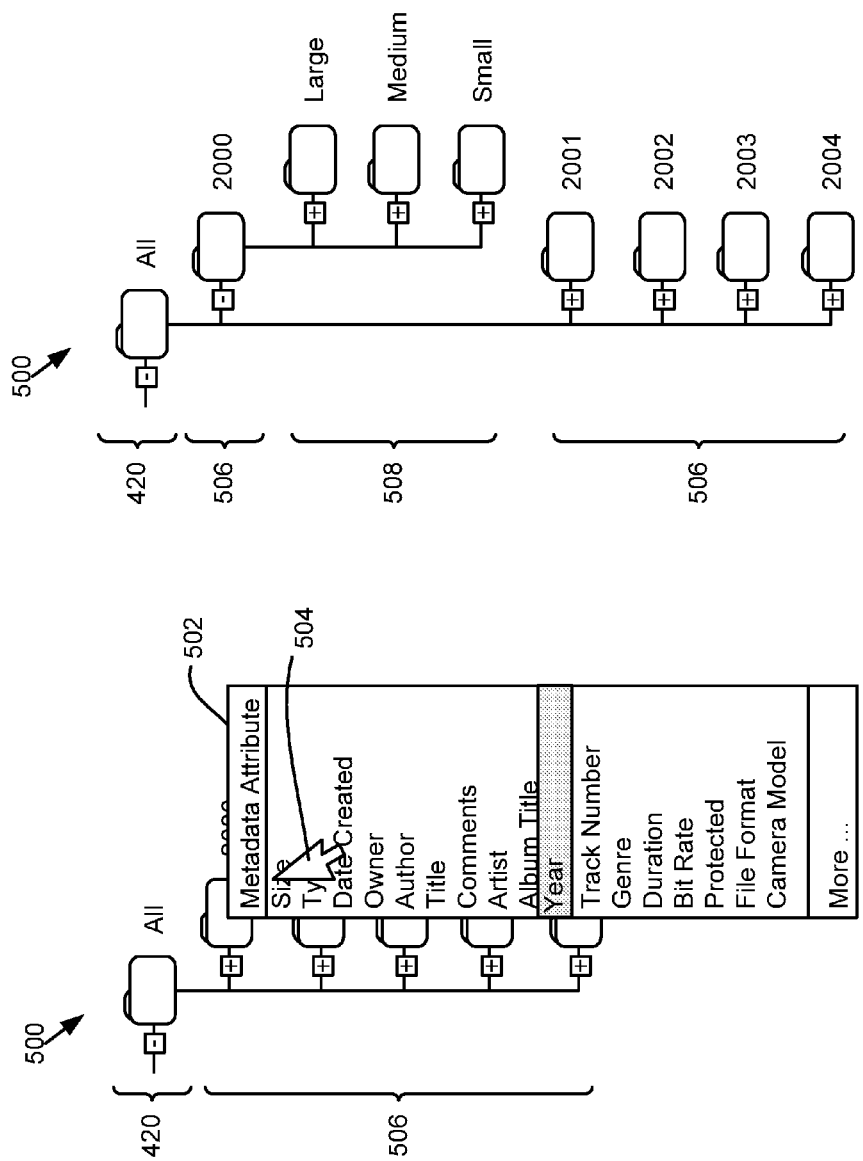

METHOD AND APPARATUS FOR FILTERING SEARCH RESULTS

FIELD

The subject matter disclosed herein relates to the searching and more particularly relates to filtering of search results.

BACKGROUND

1. Description of the Related Art

Finding electronic files, web pages, or other data objects often involves the use of a search engine. Search engines are generally programs or systems that search available information on one or more data storage devices, servers, or networks to locate a file, web page or data object that matches search criteria. For example, web search engines often search data and/or web pages that are available through the internet. Web search engines generally provide a field where a user can input search criteria such as a keyword, phrase, or other criteria. In some situations logical operators, search forms, or other methods may be provided and/or processed to provide more control to the user. Often large amounts of data provide enormous amounts of results that can be difficult to view and look through by a user.

2. Brief Summary

A method for filtering web search results is disclosed. An apparatus and computer program product also perform the functions of the method. The method includes extracting metadata attributes and associated attribute values from web search results. The web search results may be results returned in response to a search request submitted by a user to a web search engine. The search request may include search criteria. The web search results may include entries organized into a results list with each entry including data extracted from a data object searched by the web search engine and meeting the search criteria. The metadata attributes and associated attribute values extracted from the data objects may correspond to the entries of the results list. The method includes presenting the extracted metadata attributes to a user for selection by the user and receiving input from the user indicating a selected metadata attribute. The method also includes presenting attribute values associated with the selected metadata attribute to the user for selection by the user and receiving input from the user indicating a selected attribute value. The method includes filtering the web search results based on the selected attribute value. Each entry in the filtered web search results may include the selected attribute value. The method also includes displaying a filtered results list to the user, the filtered results list including the filtered web search results.

An apparatus includes a plurality of modules to execute the steps of the above method. The apparatus may include an extraction module, a metadata attribute presentation module, a metadata attribute receiving module, an attribute value presentation module, an attribute value receiving module, a filter module, and a results display module.

The extraction module extracts metadata attributes and associated attribute values from web search results. The web search results may be results returned in response to a search request submitted by a user to a web search engine. The search request may include search criteria. The web search results may include entries organized into a results list with each entry including data extracted from a data object searched by the web search engine and meeting the search criteria. The metadata attributes and associated attribute values extracted from the data objects may correspond to the entries of the results list. The metadata attributes presentation module presents the extracted metadata attributes to a user for selection by the user and the metadata attributes receiving module receives input from the user indicating a selected metadata attribute. The attribute value presentation module presents attribute values associated with the selected metadata attribute to the user for selection by the user and the attribute value receiving module receives input from the user indicating a selected attribute value. The filter module filters the web search results based on the selected attribute value. Each entry in the filtered web search results may include the selected attribute value. The results display module displays a filtered results list to the user, the filtered results list including the filtered web search results.

A computer program product includes a computer readable storage medium having computer readable program code embodied therewith. The computer readable program code includes computer readable program code configured to perform the steps and functions of the above method and apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5A illustrates a schematic diagram of a display of one embodiment of an expandable tree structure and a metadata attributes list in accordance with the present invention;

FIG. 5B illustrates a schematic diagram of a display of one embodiment of the expandable tree structure of FIG. 5A with the expandable tree structure expanded to show child display objects in accordance with the present invention;

FIG. 5C illustrates a schematic diagram of a display of the expandable tree structure of FIG. 5B and a metadata attributes list in accordance with the present invention;

FIG. 5D illustrates a schematic diagram of a display of one embodiment of the expandable tree structure of FIG. 5C with the expandable tree structure expanded to show grandchild display objects in accordance with the present;

DETAILED DESCRIPTION OF THE INVENTION

Figure 1:
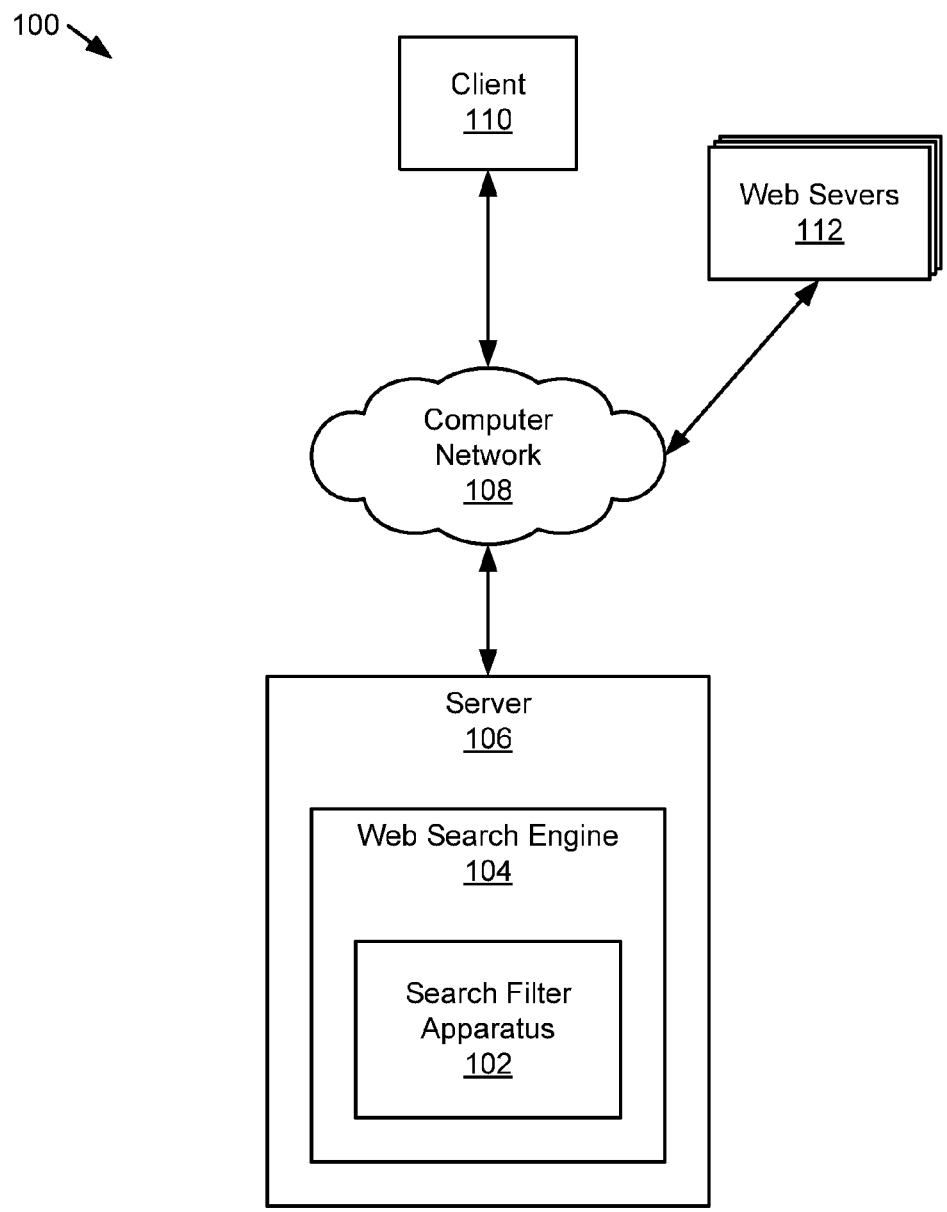
FIG. 1 is a schematic block diagram illustrating one embodiment of a system for web searching in accordance with the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for web searching in accordance with the present invention. The system 100, in one embodiment, includes a search filter apparatus 102, a web search engine 104, a server 106, a computer network 108, a client 110, and web servers 112, which are described below. The search filter apparatus 102 extracts metadata attributes from web search results and allows a user to select one or more metadata attributes to filter the web search results in a series of drill down steps. The search filter apparatus 102 is depicted as part of a web search engine 104, but all or part of the search filter apparatus 102 may be separate from the web search engine 104 and/or the server 106. For example, the search filter apparatus 102 may be an application that runs separately from a web search engine 104 on the server 106, one of the web servers 112, on the client 110, or any other processing system. In one embodiment, the web search engine 104 may provide web search results to the search filter apparatus 102 which may then allow the user to filter the received web search results in a series of drill down steps.

The web search engine 104 and search filter apparatus 102 may be part of a server 106 as shown accessible by a client 110 through a computer network 108 or may be installed on or accessible by a computing device, such as a desktop computer, workstation, laptop computer, tablet computer, a mobile computing device such as a cellular phone or smartphone, or any other computing device with access to a computer network 108. The computing device may be a client 110 accessing the web search engine 104 and/or the search filter apparatus 102 by way of the server 106. In one embodiment, the computing device includes the search filter apparatus 102 and accesses a web search engine 104 located on the server 106. The server 106 may be part of a cloud computing environment accessible by the computing device. One of skill in the art will recognize other ways of implementing the search filter apparatus 102 and web search engine 104 for user access using a computing device.

The computer network 108 may be a single network or may include several computer networks 108 linked together. The computer network 108 may include a local area network ("LAN"), wide area network ("WAN"), wireless network, etc. The computer network 108 may include hardware such as the server 106, routers, switches, cabling, and other communication hardware. The computer network 108 may include the internet and may access remote web servers 112 with data objects that satisfy search criteria for a web search. Data objects or web pages available to the web search engine 104 may be located within a proprietary computer network 108, such as within servers 106, web servers 112, etc. of a company or may be located external to a proprietary computer network 108 and may be available for public access. Web pages and data objects may include data, information, diagrams, images, music, document, files, or any other content available using a web search engine 104. One of skill in the art will recognize other content and web pages available for access by a web search engine 104 over one or more computer networks 108.

Figure 2:
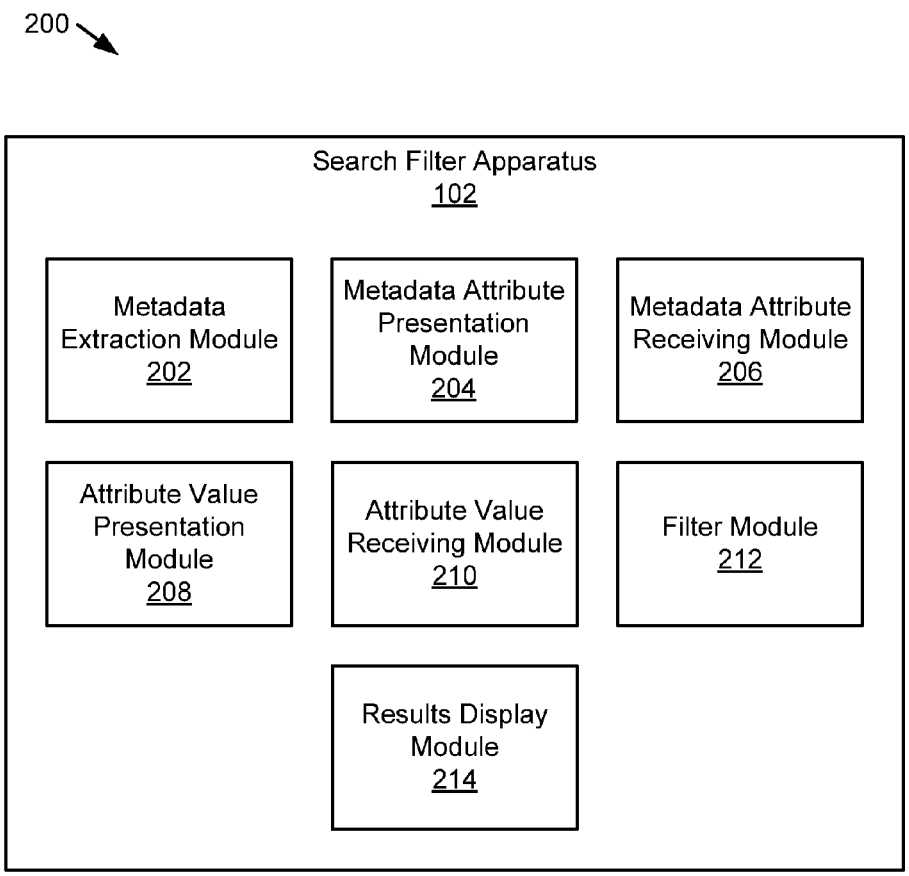
FIG. 2 is a schematic block diagram illustrating one embodiment of a search filter apparatus in accordance with the present invention.

FIG. 2 is a schematic block diagram illustrating one embodiment of an apparatus 200 for filtering web search results in accordance with the present invention. In one embodiment, the apparatus 200 includes a search filter apparatus 102 that includes a metadata extraction module 202, a metadata attribute presentation module 204, a metadata attribute receiving module 206, an attribute value presentation module 208, an attribute value receiving module 210, a filter module 212, and a results display module 214, which are described below.

In one embodiment, the search filter apparatus 102 includes a metadata extraction module 202 that extracts metadata attributes and associated attribute values from web search results. Typically the web search results are returned in response to a search request submitted by a user to a web search engine 104. The search request includes some type of search criteria selected by the user to enable the web search engine 104 to find desired results. The search criteria are typically input using some type of user interface, such as a keyboard, mouse, touch screen, etc. The search criteria may be in various formats, such as a natural language format, Boolean logic, information in a pre-defined form, and the like. The web search engine 104 may be configured to search one or more computer networks 108, such as the internet, a company LAN, etc. Examples of web search engines 104 are Google®, Bing®, Yahoo!®, etc. A web search engine 104 may include a proprietary search tool that includes logical search rules, form-based search tools, etc. A web search engine 104 may be any search tool that returns search results based on search criteria input by a user. The user may be a person or may be an application or computer program initiating a search.

The web search results returned by the web search engine 104 include data extracted from data objects searched by the web search engine 104 and also meeting the search criteria. Exemplary data objects which may be searched may include a web page, an image, an audio file, a video file, a document, and the like. Typically, the web search results are organized into a results list where data from a data object is grouped as an entry in the results list. The data for a particular data object may include a link to the data object, and/or may include text, images, files, etc. Typically an entry in the results list is grouped in such a way that a user may be able to distinguish data from a first data object from data from another data object.

Data objects such as web pages, images, documents, and the like often includes metadata attributes and associated attribute values. In one embodiment, the metadata extraction module 202 extracts the metadata attributes and associated attribute values from the data of the results or from the data objects themselves. For example, the metadata extraction module 202 may search the data objects or associated data to locate and identify metadata categories and associated attribute values. Some examples of metadata attributes for data objects include file size, file type, date created, owner, author, comments, date information, artist, bit rate, protection status, camera model, or any other useful information.

Attribute values are typically information that fits into a metadata attribute. According to one embodiment, the metadata attribute may be described as a category for categorizing or indicating the meaning of attribute values. For example, under the "date created" metadata attribute, each entry in the results list is an attribute value that includes a date and the date may indicate the "date created". An attribute value for the metadata attribute "date created" may be Jun. 7, 2011. In another example, for the metadata attribute "year," attribute values may be 2009, 2010, 2011, and 2012 as well as other years. Entries in the results list that include a year may be included in a group of entries with a metadata attribute of "year."

In one embodiment, metadata may be included in the data object itself, in an associated file, or in any other location. For example, a header for a file or metadata located in a specific location on webpage may include data about metadata attribute and/or attribute values associated with a specific file or web page. The metadata, in some embodiments, may be organized into a table or other data structure where a metadata attribute is associated with an attribute value for the data object. One of skill in the art will recognize other metadata attributes, associated attribute values, and data structures for metadata associated with a data object of a variety of types.

In one embodiment, the search filter apparatus 102 includes a metadata attribute presentation module 204 that presents the extracted metadata attributes to the user for the user to select one or more metadata attributes. The metadata attribute presentation module 204 may present the metadata attributes to the user in a variety of different formats. In one embodiment, the metadata attributes are presented on a display screen. For example, metadata attribute presentation module 204 may present the user with a list, table, etc. of metadata attributes on a display screen. The list of metadata attributes may be presented to the user based on and/or in response to a user selection of some type. For example, the user may set a preference that when web search results are presented, the metadata attribute list is presented along with the web search results. In another example, after web search results are displayed, the user may take some other action to have the metadata attributes displayed. In another embodiment, the web search engine 104 automatically displays the metadata attributes or may include a display object which may be selected by the user to display the metadata attributes. Exemplary display objects may include an item in a menu, a button, a display object in a tree structure, or the like. The user may be able to select the display object to have the metadata attribute presentation module 204 initiate display of the metadata attributes.

In one embodiment, the search filter apparatus 102 includes a metadata attribute receiving module 206 that receives input from the user indicating a selected metadata attribute of the presented metadata attributes. The metadata attribute receiving module 206 may receive input from a variety of input devices such as a keyboard, mouse, touch screen, or any other input device that may be used to select a presented metadata attribute. In one embodiment, a selection or action taken by a user may trigger an event which provides input to the metadata attribute receiving module 206 indicating which metadata attribute was selected by the user. For example, the metadata attribute receiving module 206 may receive input that the user clicked on a check box, clicked on text corresponding to the metadata attribute, or the like.

In one embodiment, the search filter apparatus 102 includes an attribute value presentation module 208 that presents attribute values associated with the selected metadata attribute to the user for selection by the user. The presented attribute values may include attribute values that correspond to the selected metadata attribute. For example, if a user selected a "year" metadata attribute the presented attribute values may include years extracted from the search results. For example, if there are search results with the years 2011, 2009, and 2008, but no other years, the attribute value presentation module 208 may present a list, a number of data objects, or the like that include the attribute values 2011, 2009, and 2008.

The attribute value presentation module 208 may present the attribute values to the user in a manner similar to how the metadata attribute presentation module 204 presents metadata attributes. For example, the attribute value presentation module 208 may present a list, a table, or a display object to the user. The user may be able to select an attribute value within the presented list or table, or select the display object to select a desired attribute value. In one embodiment, the attribute value presentation module 208 may present the attribute values in response to the metadata attribute receiving module 206 receiving the selection of one or more metadata attributes. In one embodiment, the attribute value presentation module 208 may present the attribute values following a selection of a data object, a button, or any other selectable object on a display screen.

In one embodiment, the search filter apparatus 102 includes an attribute value receiving module 210 that receives input from a user indicating a selected attribute value of the presented attribute values. Similar to the metadata attribute receiving module 206, the attribute value receiving module 210 may receive input from a variety of input devices such as a keyboard, mouse, touch screen, or any other input device that may be used by a user to select a presented metadata attribute. In one embodiment, a selection or action taken by a user may trigger an event which provides input to the attribute value receiving module 210 indicating which metadata attribute was selected by the user. For example, the metadata attribute receiving module 210 may receive input that the user clicked on a check box, clicked on text corresponding to the attribute value, or the like.

In one embodiment, the search filter apparatus 102 includes a filter module 212 that filters the web search results based on the selected attribute value. In one embodiment, each entry in the filtered web search results includes the selected attribute value. For example, if the user selected "year" as the metadata attribute and then selected "2011" as the attribute value, only entries including "2011" as the "year" metadata attribute will listed in the filtered web search results. In one embodiment, the filter module 212 filters a current set of web search results. For example, the filter module 212 may filter the web search results provided by a web search engine 104. In one embodiment, the filter module 212 may filter web search results that have already previously been filtered by the filter module 212. For example, if the filter module 212 filters web search results according to a first selected attribute value to create first filtered web search results the selection of a second selected attribute value may result in the filter module 212 filtering the first filtered web search results based on the second selected attribute value to create second filtered web search results. In this manner, a user may be able to perform a number of consecutive filters and thereby drill into the search results to find desired information.

In one embodiment, the search filter apparatus 102 includes a results display module 214 that displays information or results from one or more of the other modules 202-212. In one embodiment, the results display module 214 displays a filtered results list to the user. For example, the results display module 214 may display a filtered results list that includes the web search results as filtered by the filter module 212. The filter results list may be displayed on a display screen. In one embodiment, the results list is displayed as a portion of a web page in a web browser. Other embodiments may display the results list in any program, such as a document, specialized search program, or the like. In one embodiment, the results display module 214 updates the display of a results list each time the filter module 212 filters the web search results. In one embodiment, the results display module 214 filters the web search results each time a user selects an option to update the results.

Figure 3:
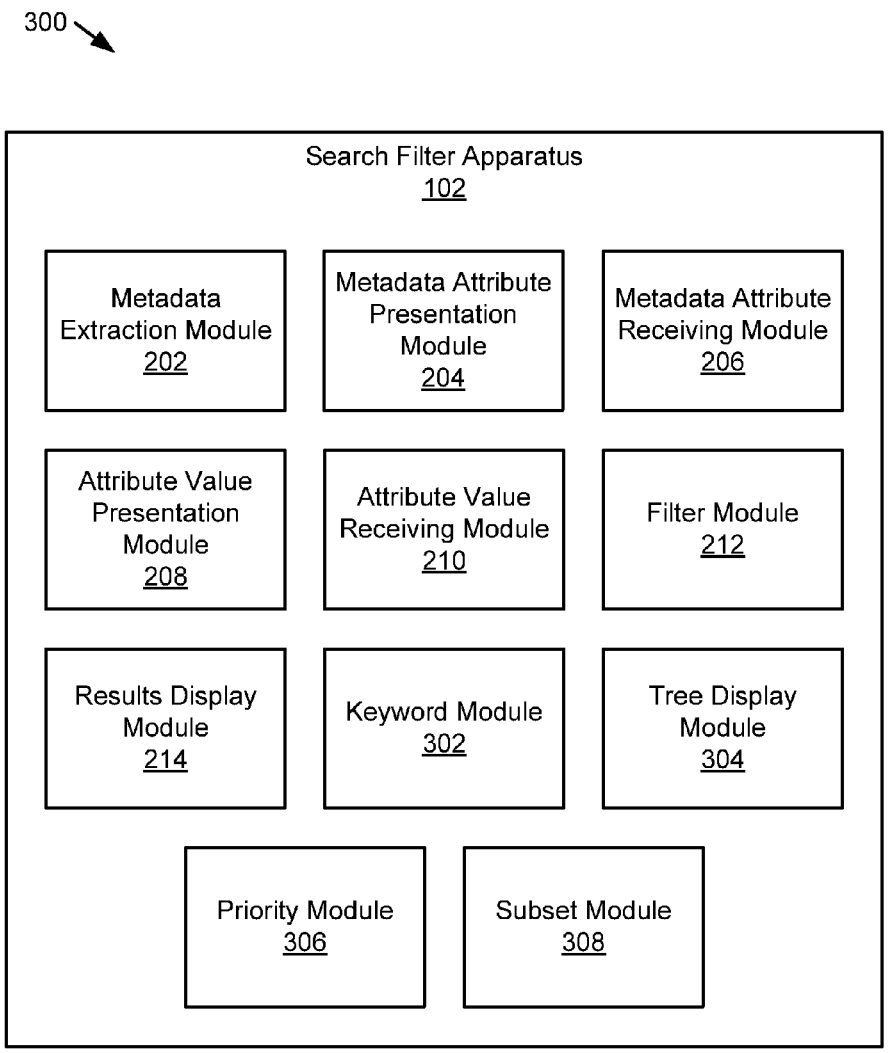
FIG. 3 is a schematic block diagram illustrating another embodiment of a search filter apparatus in accordance with the present invention.

FIG. 3 is a schematic block diagram illustrating another embodiment of an apparatus 300 for filtering web search results in accordance with the present invention. The apparatus 300 includes an embodiment of a search filter apparatus 102 with a metadata extraction module 202, a metadata attribute presentation module 204, a metadata attribute receiving module 206, an attribute value presentation module 208, an attribute value receiving module 210, a filter module 212, and a results display module 214, which are substantially similar to those described in relation to the apparatus 200 of FIG. 2. In addition, the embodiment of the search filter apparatus 102 may include one or more of a keyword module 302, a tree display module 304, a priority module 306, and a subset module 308.

In one embodiment, the search filter apparatus 102 includes a keyword module 302. The keyword module 302 may display a filter field for receiving keyword input from a user. For example, the filter field is a text editable field, in one embodiment, where a user may enter text using a keyboard or other input device. In one embodiment, the keyword module 302 provides the keyword received from a user to the filter module 212 to filter the web search results. For example, the filter module 212 may filter the web search results by one or more of a selected attribute value and a keyword. In one embodiment, the keyword module 302 in combination with the filter module 212 allows further restriction and searching of web search results returned by a search engine 104 without running a further query with the search engine 104. In one embodiment, the filter module 212 may filter web search results based on if a keyword is located anywhere within metadata corresponding to a data object, the data object itself, or in the data within an entry in the web search results corresponding to a data object. For example, the filtering of the web search results based on the keyword by the filter module 212 may not be restricted to a specific metadata attribute or even to metadata attributes in general.

In other embodiments, the keyword module 302 filters web search results for multiple key words, for a phrase, for a symbol, for a keyword with wildcard characters, and the like. In another embodiment, the keyword module 302 filters web search results prior to or in conjunction with the filter module 212 filtering web search results based on a selected attribute value. One of skill in the art will recognize other search terms that may be used by the keyword module 302 and other ways that the keyword module 302 may be integrated with the functions of the modules 202-214 described above.

In one embodiment, the search filter apparatus 102 includes a tree display module 304. The tree display module 304 may display a display object of an expandable tree structure. In another embodiment, the display object is displayed in response to receiving web search results from a web search engine 104. In another embodiment, the display object is displayed with a portion of the web search results. In another embodiment, the display object and/or the expandable tree structure are updated based on information or data from one of the other modules 202-213, 302 described above. For example, the structure and/or elements within the expandable tree structure may change over time and the tree display module 304 may update the display object and/or add or remove additional display objects to reflect a current tree structure. In one embodiment, the expandable tree structure may be expanded based on receipt of a selection of a metadata attribute by the metadata attribute receiving module 206 and/or receive of a selection of an attribute value by the attribute value receiving module 210.

In one embodiment, one or more display objects within the expandable tree structure displayed by the tree display module 304 may correspond to one or more metadata attributes and/or attribute values. For example, metadata attributes and/or attribute values may be presented by the metadata attribute presentation module 204 and the attribute value presentation module, respectively, as data objects within the expandable tree structure. An exemplary expandable tree structure and presentation of metadata attributes and attribute values will be discussed further in relation to FIGS. 4 and 5A-5D below.

In one embodiment, the search filter apparatus 102 includes a priority module 306 that prioritizes the metadata attributes based on a number of occurrences for that metadata attribute in the entries of a results list. In the same or an alternate embodiment, the priority module 306 priorities attribute values based on a number of occurrences in the entries of a result list. In one embodiment, priority module 306 priorities the metadata attributes and/or attribute values with a higher number of occurrences with a higher priority than metadata attributes and/or attribute values with a lower number of occurrences. In other embodiments, the priority module 306 prioritizes the metadata attributes by numerical order, alphabetical order, age, etc.

In one embodiment, the priority module 306 may organize the metadata attributes and/or the attribute values based on largest number of occurrences. For example, the priority module 306 may organize the metadata attributes so that when metadata attributes are presented to a user by the metadata attribute presentation module 204 the metadata attribute with the largest number of occurrences is displayed first to the user. Similarly, the priority module 306 may organize the attribute values so that when attribute values are presented to a user by the attribute value presentation module 208 the attribute value with the largest number of occurrences is displayed first to the user. In another embodiment, the priority module 306 may organize the metadata attributes and/or attribute values so that a metadata attribute and/or attribute value with the highest priority will be the easiest to select.

In one embodiment, the priority module 306 may include a subset module 308. The subset module 308 may create a subset of metadata attributes or attribute values. In one embodiment, the subset module 308 may create a subset of attributes which may be displayed to the user. The user may be able to scroll through, page through, or otherwise move through a list or series of consecutive lists of metadata attributes to see what metadata attributers and/or attribute values are available. In one embodiment, a subset of metadata attributes includes metadata attributes which were most highly prioritized by the priority module 306. In one embodiment, a subset of attribute values includes attribute values which were most highly prioritized by the priority module 306. In one embodiment, a metadata attribute subset created by the priority module 306 may be presented by the metadata attribute presentation module 204 for selection by a user. In another embodiment, an attribute value subset created by the priority module 306 may be presented by the attribute value presentation module 208 for selection by a user.

Figure 4:
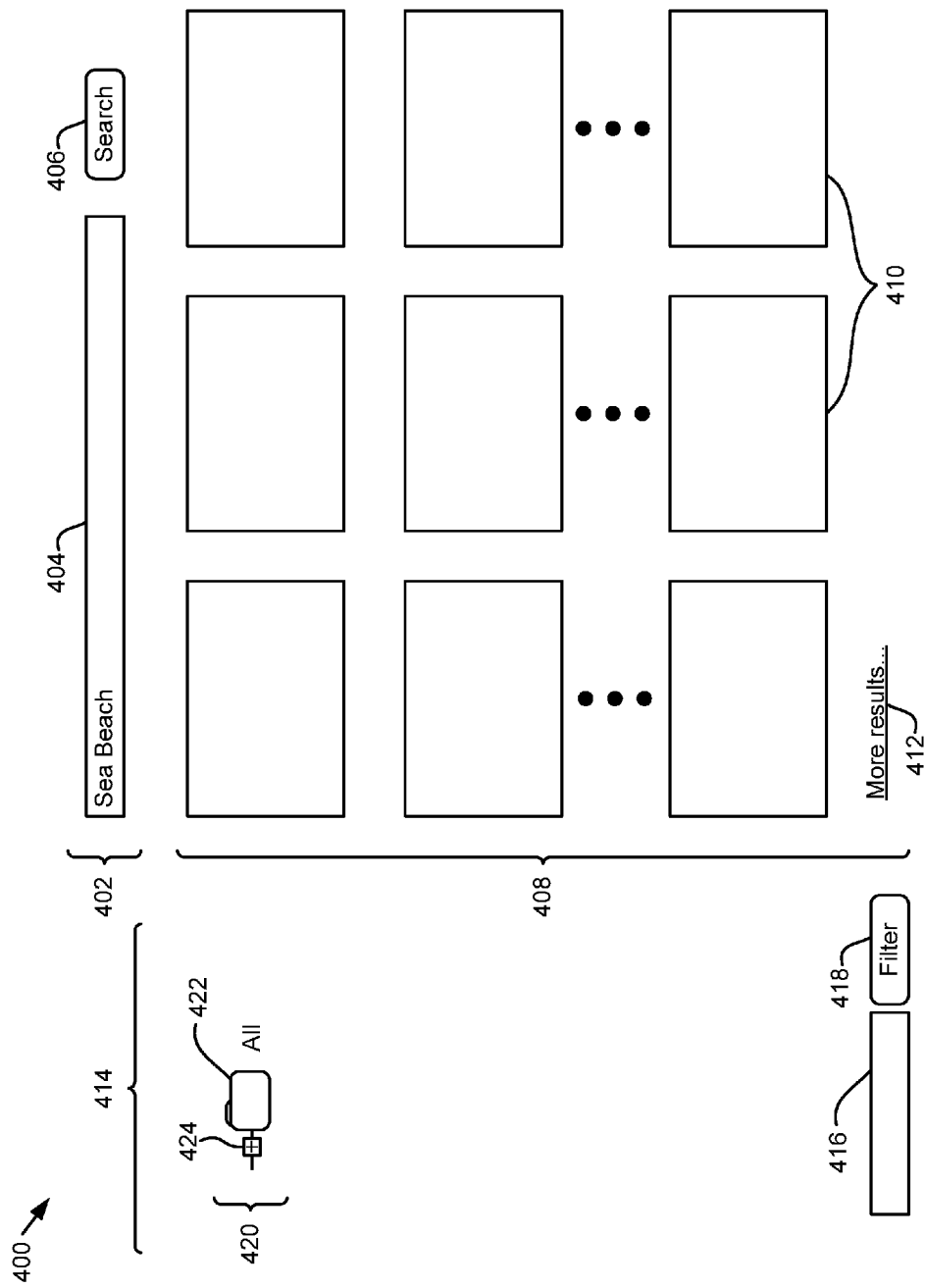
FIG. 4 is illustrates a screen capture of one embodiment of a search results page 400 in accordance with the present invention.

Turning to FIG. 4 exemplary display provided by the search filter apparatus 102 and/or component modules 202-214 and 302-308 will be discussed. FIG. 4 illustrates an exemplary screen capture of a search results page 400 that may be displayed by the search filter apparatus 102. For example, the search results page 400 may be a page displayed within a browser. The search results page 400 is exemplary only and results pages or display of results and/or other display elements may be provided in a variety of other programs and in a variety of varying formats in other embodiments.

In the depicted embodiment, the search results page 400 includes a web search section 402 where a user may enter and/or modify web search criteria. The web search section 402 provides objects and tools for specifying search criteria to be used by a web search engine 104. For example, a web search engine 104 may use input provided by the user in the web search section 402 to perform a web search. The web search section 402 includes a text field 404 and a search button 406. The text field 404 may be text editable and allow a user to enter search criteria in various formats such as a keyword, phrase, a natural language format, Boolean logic, or the like. In the depicted embodiment, the term "sea beach" has been entered within the text field 404. A user may be able to initiate a search based on criteria entered in the text field 404 by selecting the search button 406. Additional and alternative tools and/or options may be provided in a web search section 402. For example, many web search engines 104 provide advanced search options where predetermined fields or other aspects of a web page or data object may be specified.

The search results page 400 also includes a results list section 408 where search result entries 410 are displayed. The entries 410 may each correspond to a data object that matches criteria entered in the web search section 402. In the depicted embodiment, the entries 410 include images that were results for the searched for criteria. For example, the entries 410 may be images that match the search criteria within the text field 404. In one embodiment, the results list section 408 only displays a portion of entries 410 that match a search result. For example, a predefined number of entries 410 may be displayed in the results list section 408 with additional entries 410 accessible by requesting a more results option 412, by scrolling, paging down, etc.

The search results page 400 also includes a search filter section 414. The search filter section 414 may include a number of fields or tools to filter the search results provided as entries 410 in the results list section 408. In the depicted embodiment, the search filter section 414 includes a filter field 416 and an associated filter button 418. In one embodiment, the filter field 416 and the filter button 418 are displayed by the keyword module 302. As described above, the filter field 416 may receive a keyword, phrase, or any other search criteria to filter the search results returned by a web search engine 104. For example, the entries 410 in the results list section 408 may be filtered based on whether they include the search criteria entered in the filter field 416.

In the depicted embodiment, the search filter section 414 includes a display object 420 of an expandable tree structure. In the depicted embodiment, the display object 420 includes a selectable icon 422 and an expand indicator 424. The selectable icon 422 of the display object 420 in the depicted embodiment is an image of a folder. In other embodiments, the selectable icon 422 may resemble any type of object as part of an expandable tree structure, or may be omitted. In one embodiment, the expand indicator 424 indicates whether the display object 420 is expanded or can be expanded. For example, the expand indicator 424 depicted in FIG. 4 includes a "+" sign which may be selected to expand the display object 420.

In one embodiment, the display object 420 is a root display object. For example, the display object 420 may be displayed as containing metadata attributes and/or attribute values extracted by the metadata extraction module 202. In the depicted embodiment, the word "All" is located next to the selectable icon 422 of the display object to indicate that "all" metadata attributes or attribute values may be accessed through the display object 420. In other words, the display object 420 may be associated with all available metadata attributes and/or attribute values. For example, when the root display object is visible, unfiltered entries 410 may be displayed.

In one embodiment, the display object 420 may be selected by a user to display search results that fall within the metadata associated with the display object 420. For example, the results list section 408 may be updated in response to a user clicking on the selectable icon 422 to reflect all the entries 410 that correspond to the display object 420. In one embodiment, selecting the selectable icon 422 would result in all entries returned by a web search engine 104 being included in the results list section 408 or available through the more results option 412. For example, the "All" icon may be selected as a reset to display unfiltered web search results.

In one embodiment, the selection of the expand indicator 424 may result in a list of metadata attributes being presented by the metadata attribute presentation module 204 for selection by the user. According to one embodiment, a selection of a presented metadata attribute would result in the tree display module 304 displaying a number of child display objects of the display object 420.

Turning to FIGS. 5A-5D exemplary operation and display by the search filter apparatus 102 will be illustrated, according to one embodiment. The web search section 402 and the results list section 408 have been omitted from FIGS. 5A-5D for clarity. FIG. 5A illustrates an exemplary schematic diagram of portions of a possible display of an expandable tree structure 500. The display object 420 is shown with a metadata attributes list 502. According to one embodiment, the metadata attributes list 502 includes metadata attributes presented by the metadata attributes presentation module 204. In one embodiment, the metadata attributes presentation module has presented the metadata attributes list 502 in response to a user selecting the expand indicator 424. For example, the user may have clicked on the expand indicator 424 using a mouse or other input device.

The metadata attributes list 502 includes a plurality of metadata attributes that have been extracted by the metadata extraction module 202. In one embodiment, the metadata attributes in the metadata attributes list 502 include any metadata attributes that correspond to the entries 410 in the results list section 408. In one embodiment, the metadata attributes in the metadata attributes list 502 include metadata attributes extracted by the metadata extraction module 202. In another embodiment, the metadata attributes list 502 includes a subset of metadata attributes, such as a subset created by the subset module 308. For example, the metadata attributes presented in the metadata attributes list 502 may be the most highly prioritized metadata attributes as prioritized by the priority module 306. In one embodiment, the metadata attribute of the metadata attributes list 502 are organized as determined by the priority module 306. In one embodiment, metadata attributes that occur most frequently are located near the top of the metadata attributes list 502. In another embodiment, metadata attributes that have attribute values that occur most frequently are located near the top of the metadata attributes list 502.

The metadata attributes of the metadata attributes list 502 are selectable by a user. A user may use a keyboard, mouse, touch screen, or any other input device to select at least one of the metadata attributes. In the depicted embodiment, a mouse indicator 504 is shown as a user is about to click on the "Year" metadata attribute within the metadata attributes list 502. In one embodiment, the metadata attributes list 502 one or more checkboxes or other input structures may be provided to select more than one metadata attribute at a time.

FIG. 5B illustrates an exemplary schematic diagram of portions of a possible display of an expandable tree structure 500 after a user has selected the "Year" metadata attribute from the metadata attributes list 502 of FIG. 5A. According to one embodiment, the expandable tree structure 500 has been updated and expanded by the tree display module 304 to show child display objects 506 of the display object 420. The expand indicator 424 has changed from a "+" to a "−" to indicate that the "All" display object 420 has been expanded. According to one embodiment, each of the child display objects 506 represent an attribute value that corresponds to the metadata attribute selected from the metadata attributes list 502. For example, each of the child display objects 506 "2000", "2001", "2002", 2003", and "2004" are each attribute values that represent a "Year" for one or more corresponding search results. According to one embodiment, the tree display module 304 and/or the attribute value presentation module 208 present the child display objects 506 and/or the textual labels "2000", "2001", "2002", 2003", and "2004" to present attribute values for selection by a user.

According to one embodiment, each of the display objects 420, 506 is selectable by a user. According to one embodiment, a selection of one of the display objects 420, 506 is received by the attribute value receiving module 210. In one embodiment, each time a user select one of the display objects 420, 506 the results list section 408 (not shown) is updated to include entries that have the selected attribute value and typically entries that lack the selected attribute value are excluded. For example, if a user uses a mouse indicator 504 to click on the "2000" child display object 506 the results list section 408 may be updated to include entries 410 that include "2000" at a "Year" metadata attribute while excluding entries with a "Year" metadata attribute with other years as attribute values, i.e. "2001," "2002," etc. As another example, if a user selects the parent display object 420 the results list section 408 may be updated to include all entries 410 returned by a web search engine 104. As depicted in FIG. 5B the "2000" child display object 506 may change appearance in response to being selected.

FIG. 5C illustrates an exemplary schematic diagram of portions of a possible display of an expandable tree structure 500 after a user has selected an expand indicator 424 of the "2000" child display object 506 of FIG. 5B. A metadata attributes list 502 is presented to allow a user to select a metadata attribute for further filtering. The "Year" display attribute that corresponds to the selected child display object 506 is shown grayed out indicating that it has already been selected and/or is not selectable. The mouse indicator 504 is shown as a user is about to select the "Size" metadata attribute from the metadata attributes list 502.

FIG. 5D illustrates an exemplary schematic diagram of portions of a possible display of the expandable tree structure 500 after a user has selected the "Size" metadata attribute from the metadata attributes list 502 of FIG. 5C. The "2000" child display object 506 is shown expanded with grandchild display objects 508. Once again the grandchild display objects 508 may represent attribute values corresponding to the "Size". The grandchild display objects 508 may be presented by the tree display module 304 and/or the attribute value presentation module 208. A user may be able to select any of the display objects 420, 506, 508 to filter web search results based on the selected display object and structure of the expandable tree structure 500. For example, if a user selects the "Large" grandchild display object 508 the results list section 408 (not shown) may include entries 410 that include a "2000" attribute value as a "Year" metadata attribute and a "Large" attribute value as a "Size" metadata attribute while excluding entries with a "Year" metadata attribute other than "2000" and excluding entries with a "Size" metadata attribute other than "Large." In one embodiment, entries 410 that are "Large" may not actually have the text "Large" as part of an attribute value but rather may have a file size that exceeds a certain threshold.

One of skill in the art will understand in light of the present disclosure that further selections of metadata attributes and attribute values may be performed. Although the only two iterations of attribute value selection etc. have been performed in the depicted embodiment a user may decide to further restrict using more metadata attributes and attribute values. According to one embodiment, a use may be able to further modify the expandable tree structure 500 until all metadata attributes have been selected within a particular branch of display objects 420, 506, 508.

In one embodiment, the search filter apparatus 102 allows for dynamic order of filtering based on metadata attributes and/or attribute values. For example, the sequence of attribute values used to filter the results list section 408 in FIGS. 4 and 5A-5D is a "2000" attribute value for a "Year" metadata attribute followed by a "Size" metadata attribute. The user may then select any remaining metadata attribute and/or attribute value to further drill into or filter the web search results. In another embodiment, the user may select "Size" first and then select "Year". The dynamic selection of consecutive metadata attributes and/or attribute values may allow a user to explore and drill into web search results in any order desired.

Figure 6:
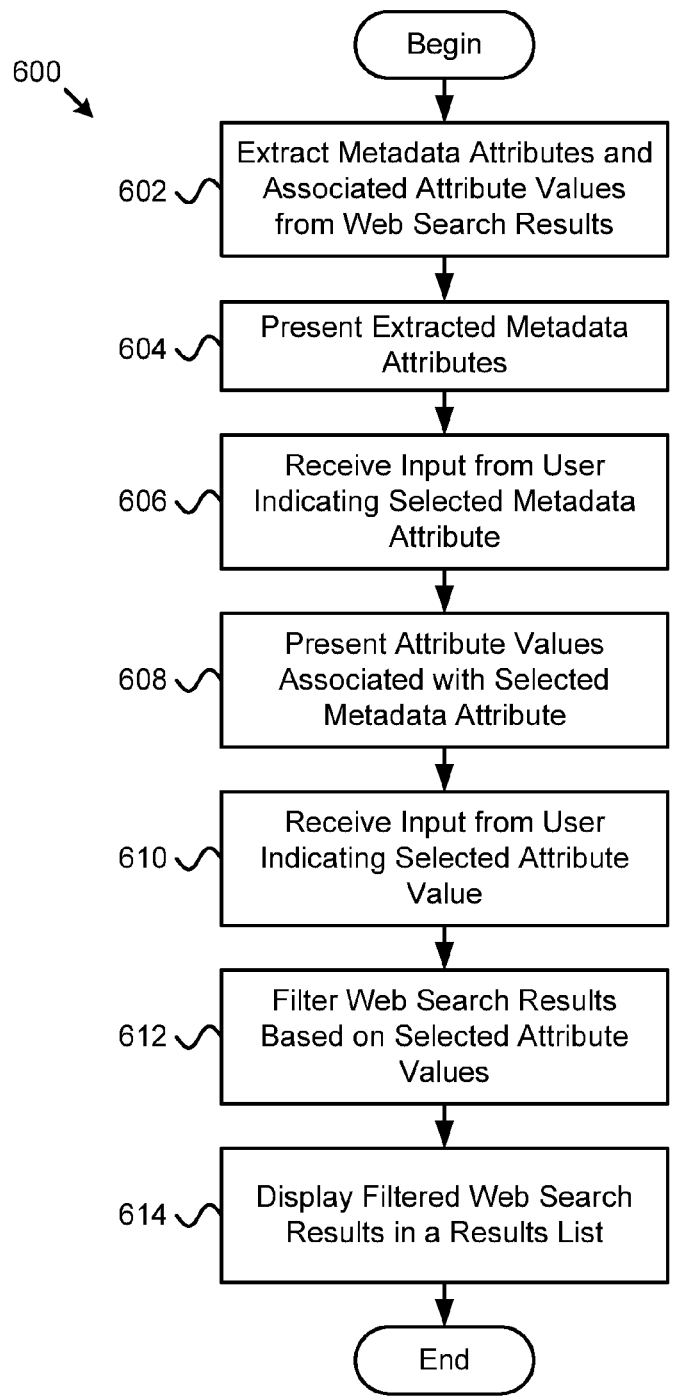
FIG. 6 is a schematic flow chart diagram illustrating one embodiment of a method for filtering web search results in accordance with the present invention.

FIG. 6 is a schematic flow chart diagram illustrating one embodiment of a method 600 for filtering search results in accordance with the present invention. The method 600, in one embodiment, includes a plurality of steps 602-614 which may be performed by a search filter apparatus 102. For example, the search filter apparatus 102 and/or one of the modules 202-214 and 302-308 may perform one or more of the steps 602-614.

The method 600 begins and the metadata extraction module 202 extracts 602 metadata attributes and associated attribute values from web search results. In one embodiment, the web search results are received from a web search engine 104. In one embodiment, the metadata extraction module 202 extracts 602 metadata attributes and/or attribute values from entries 410 within a results list. In one embodiment, the metadata extraction module 202 extracts 602 metadata and/or attribute values from data objects themselves. In one embodiment, the metadata extraction module 202 extracts 602 metadata and/or attribute values based on a predefined location within an entry 410 or a file corresponding to a data object.

In one embodiment, the metadata attribute presentation module 204 presents 604 extracted metadata attributes to a user for selection by the user. The extracted metadata attributes may be presented 604 in a variety of formats include a list or a table of metadata attributes. The extracted metadata attributes may be presented 604 by the metadata attribute presentation module 204 in response to receiving of web search results or may be in response to an action taken by a user. For example, the metadata attribute presentation module 204 may present 604 a list of metadata attributes to a user in response to the user selecting a display object 420, 506, 508 in an expandable tree structure 500.

In another embodiment, the metadata attribute receiving module 206 receives 606 input from the user indicating a selected metadata attribute of the metadata attributes that were presented by the metadata attribute presentation module 204. The user may, for example, use any type of input device such as a mouse, keyboard, touch screen, or the like to provide input indicating a selection of a metadata attribute. The metadata attribute receiving module 206 may receive 606 this input from the user.

The attribute value presentation module 208, in one embodiment, presents 608 attribute values associated with a selected metadata attribute. The attribute values may be presented 608 in a variety of formats, such as in a list, table, as a display object, or the like. In one embodiment, an attribute value is listed as a child display object 506, 508 of another display object 420, 506. In one embodiment, each display object 420, 506, 508 is selectable by a user.

The attribute value receiving module 210, in another embodiment, receives 610 input from the user indicating a selected attribute value of the attribute values that were presented by the attribute value presentation module 208. The user may use any type of input device such as a mouse, keyboard, touch screen, or the like to provide input indicating a selection of an attribute value. The attribute value receiving module 210 may receive 610 this input from the user.

In one embodiment, the filter module 212 filters 612 web search results based on selected attribute values and/or a selected metadata attribute. In one embodiment, the filter module 212 filters 612 a results list to only include entries that have one or more selected attribute values and/or metadata attributes. In another embodiment, the filter module 212 filters 612 a current set of web search results. For example, the filter module 212 may filter 612 the web search results provided by a web search engine 104. In another embodiment, the filter module 212 filters 612 web search results that have already previously been filtered by the filter module 212. For example, if the filter module 212 filters 612 web search results according to a first selected attribute value to create first filtered web search results the selection of a second selected attribute value may result in the filter module 212 filtering 612 the first filtered web search results based on the second selected attribute value to create second filtered web search results. In this manner, a user may be able to perform a number of consecutive filters on metadata attributes extracted from search results and thereby drill into the search results to find desired information.

The results display module 214, in one embodiment, displays 614 filtered web search results in a results list, and the method 600 ends. For example, the results display module 214 displays 614 the results list to the user on a display screen or provides the results list to the user using any type of output device. In one embodiment, the filtered results list displayed 614 by the results display module 214 includes the filtered web search results filtered 612 by the filter module 212.

Figure 7:
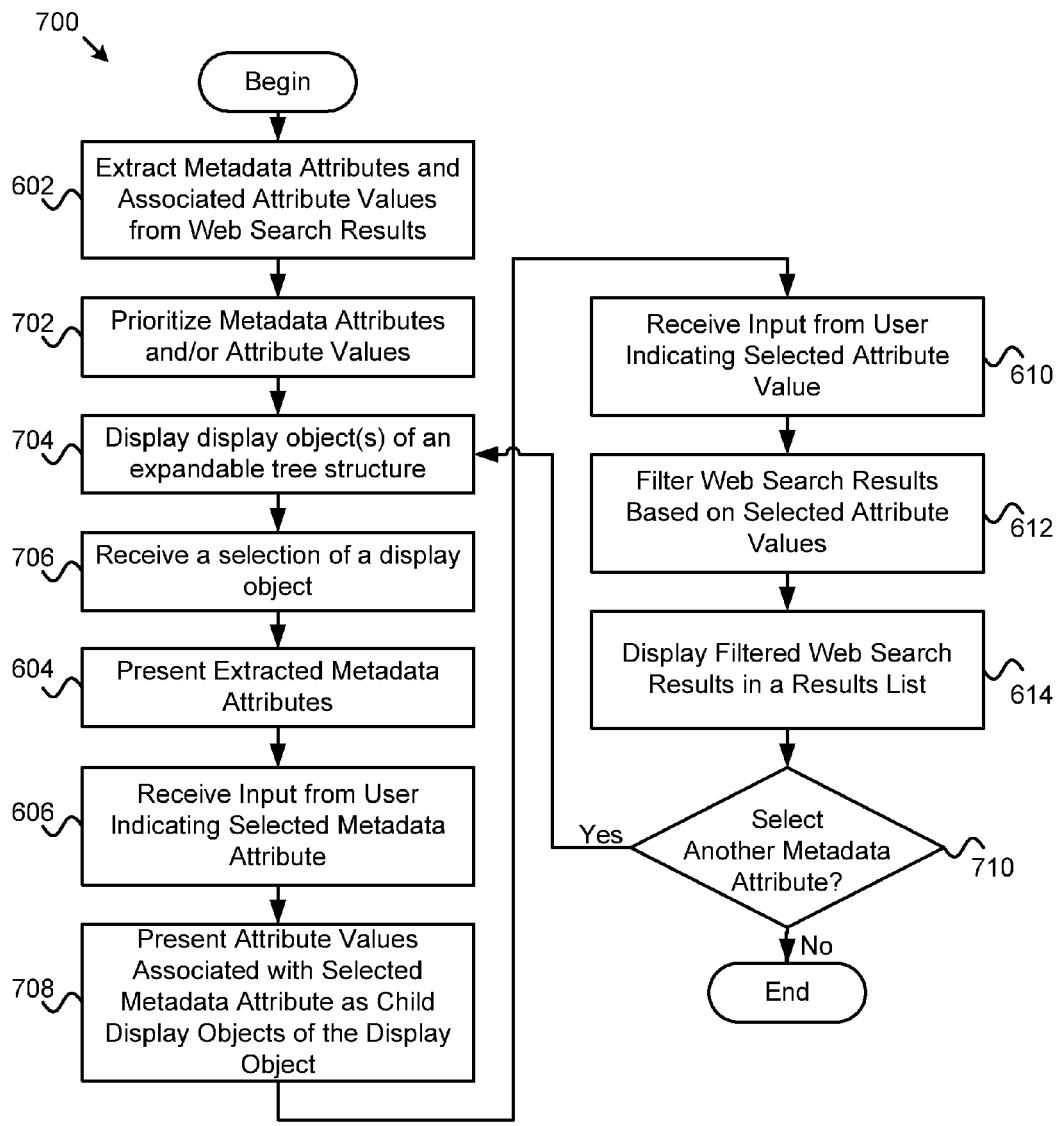
FIG. 7 is a schematic flow chart diagram illustrating another embodiment of a method for filtering web search results in accordance with the present invention.

FIG. 7 is a schematic flow chart diagram illustrating another embodiment of a method 700 for filtering search results. The method 700 includes steps 602-606 and 610-614 substantially as described in relation to method 600 or with any variations as discussed herein. The method 700 also includes a plurality of alternative or additional steps 702-710. The steps of method 700 may be performed by the search filter apparatus 102 and/or one of the modules 202-214 and 302-308.

The method 700 begins and, in one embodiment, the metadata extraction module 202 extracts 602 metadata attributes and associated attribute values from web search results. Step 602 may include any of the variations discussed above in relation to FIG. 6 or the metadata extraction module 202.

The method 700 may include the priority module 306 prioritizing 702 metadata attribute and/or attribute values. In one embodiment, the metadata attributes and/or attribute values are prioritized 702 based on number of occurrences of a specific metadata attribute, a specific attribute value, and/or attribute values corresponding to a metadata attribute. In one embodiment, the priority module 306 may create a subset of metadata attributes and/or attribute values for presentation to a user. In another embodiment, the priority module 306 may organize metadata attributes and/or attribute values based on a prioritization 702.

The method 700 may include the tree display module 304 displaying 704 one or more display objects 420, 506, 508 of an expandable tree structure 500. In one embodiment, the tree display module 304 displays 704 a display object 420 in response to receiving web search results and/or in response to extraction 602 of web search results by the metadata extraction module 202. For example, the display object 420 and/or an expandable tree structure 500 may be displayed 704 next to a list of search results.

The method 700 may include the tree display module 304 receiving 706 a selection of a display object 420. For example, the tree display module 304 may receive 706 a selection of the display object 420 of FIG. 4. In one embodiment, a user may be able to use a keyboard, mouse, touch screen, or any other input device to select a display object 420.

The method 700 may include the metadata attributes presentation module 204 presenting 604 extracted metadata attributes to the user. Step 604 may include any of the variations discussed above in relation to FIG. 6 or the metadata attributes presentation module 204. In one embodiment, only unselected metadata attributes may be presented. For example, metadata attributes presented 604 may only include metadata attributes not associated with a selected child display object and not associated with a parent display object of selected child display object.

The method 700 may include the metadata attributes receiving module 206 receiving 606 input from a user indicating a selected metadata attribute. Step 606 may include any of the variations discussed above in relation to FIG. 6 or the metadata attributes receiving module 206.

The method 700 may include the tree display module 304 and/or the attribute value presentation module 208 presenting 708 attribute values associated with a selected metadata attribute as child display objects 506, 508 of a display object of the expandable tree structure 500. In one embodiment, the child display objects may 506, 508 may include any display object that fits within another display object of a tree structure 500. For example, any display object that is a descendant of another display object may be a child display object. In one embodiment, attribute values may be presented 708 as child display objects 506, 508 of an attribute value that has been previously selected. For example, FIGS. 5A-5D illustrate exemplary child display objects 506, 508 that represent attribute values that may be selected by a user.

The method 700 may include the attribute value receiving module 210 receiving 610 input from a user indicating a selected attribute value. Step 610 may include any of the variations discussed above in relation to FIG. 6 or the attribute value receiving module 210. The method 700 may include the filter module 212 filtering 612 web search results based on selected attribute values. Step 612 may include any of the variations discussed above in relation to FIG. 6 or the filter module 212.

The method 700 may include the results display module 214 displaying 614 filtered web search results in a results list. Step 614 may include any of the variations discussed above in relation to FIG. 6 or the results display module 214. The method 700 may include the search filter apparatus 102 determining 710 whether another metadata attribute has been selected. If the search filter apparatus 102 determines 710 that another metadata attribute has been selected ("Yes" at step 710) then the method 700 may repeat one or more of steps 704-710 604, 606, 610-614. If the search filter apparatus 102 determines 710 that another metadata attribute has not been selected ("No" at step 710) the method 700 may end. In one embodiment, the method 700 allows for selection of a first attribute value and display of an updated results list based on the selected first attribute value and a later selection of a second attribute value and an updated display of the results list to reflect the second selected attribute value.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
extracting metadata attributes and associated attribute values from web search results, the web search results returned in response to a search request submitted by a user from a computer of the user to a web search engine, the search request comprising search criteria input by the user to the search engine, the search request input by the user using a user interface to the computer, the web search results comprising entries organized into a results list, each entry comprising data extracted from a data object searched by the web search engine and meeting the search criteria, the metadata attributes and associated attribute values extracted from the data objects corresponding to the entries of the results list, each metadata attribute comprising one or more associated attribute values, each metadata attribute comprising a category, each associated attribute value comprising value that corresponding to an associated metadata attribute, wherein the search request of the user does not include, in the search request, the metadata attribute and associated attribute values returned by the web search engine;

prioritizing one or more of the extracted metadata attributes and the attribute values, wherein one or more of:

the metadata attributes are prioritized based on a number of times attribute values of each metadata attribute occurs in the results list, wherein the metadata attributes are organized so a metadata attribute with a largest number of attribute value occurrences is displayed first in the display of metadata attributes to the user; and the metadata attributes are prioritized based on a number of occurrences for each metadata attribute and wherein presenting the metadata attributes to the user further comprises presenting a subset of metadata attributes to the user, the subset comprising metadata attributes occurring most often in the results list;

presenting the prioritized extracted metadata attributes to a user for selection by the user, the prioritized extracted metadata attributes presented to the user on a portion of an electronic display displaying the web search results;

receiving input from the user indicating a selected metadata attribute of the metadata attributes;

presenting attribute values associated with the selected metadata attribute to the user for selection by the user, the extracted attribute values of the selected metadata attribute are presented to the user on a portion of an electronic display displaying the web search results;

receiving input from the user indicating a selected attribute value of the attribute values associated with the selected metadata attribute;

filtering the web search results based on the selected attribute value, wherein each entry in the filtered web search results comprises the selected attribute value; and displaying a filtered results list to the user, the filtered results list comprising the filtered web search results.

2. The method of claim 1, wherein the selected metadata attribute comprises a first selected metadata attribute, the selected attribute value comprises a first selected attribute value, the filtered web search results comprise first filtered web search results, and displaying the filtered results list comprises displaying a first filtered results list, the method further comprising receiving input from the user indicating a second selected metadata attribute of the metadata attributes and receiving input from the user indicating a second selected attribute value, filtering the first filtered web search results based on the second selected attribute value to create second filtered web search results and displaying a second filtered results list to the user, the second filtered results list comprising the second filtered web search results.

3. The method of claim 1, further comprising:
displaying a display object of an expandable tree structure in response to receiving the web search results; and
receiving a selection of the display object of the expandable tree structure from the user,
wherein presenting the extracted metadata attributes to the user is in response to receiving the selection of the display object from the user.

4. The method of claim 3, wherein the attribute values are presented as child display objects of the display object in the expandable tree structure in response to receiving input from the user indicating the selected metadata attribute, the attribute values presented as child display objects associated with the selected metadata attribute.

5. The method of claim 4, further comprising presenting unselected metadata attributes in response to selecting a child display object, the unselected metadata attributes comprising metadata attributes not associated with the selected child display object and not associated with a parent display object of selected child display object.

6. The method of claim 1, wherein more than one attribute value is selectable at a time.

7. The method of claim 1, wherein the attribute values are prioritized based on a number of occurrences for each attribute value and wherein presenting the attribute values to the user comprises presenting a subset of attribute values to the user, the subset comprising attribute values occurring most often in the results list.

8. The method of claim 1, wherein the attribute values displayed to the user are organized by number of times each attribute value occurs in the results list and are organized so an attribute value with a largest number of occurrences is displayed first in the display of attribute values to the user.

9. The method of claim 1, wherein the data objects comprise one or more of a web page, an image, an audio file, a video file, and a document.

10. An apparatus comprising:
an extraction module that extracts metadata attributes and associated attribute values from web search results, the web search results returned in response to a search request submitted by a user from a computer of the user to a web search engine, the search request comprising search criteria input by the user to the search engine, the search request input by the user using a user interface to the computer, the web search results comprising entries organized into a results list, each entry comprising data extracted from a data object searched by the web search engine and meeting the search criteria, the metadata attributes and associated attribute values extracted from the data objects corresponding to the entries of the results list, each metadata attribute comprising one or more associated attribute values, each metadata attribute comprising a category, each associated attribute value comprising value that corresponding to an associated metadata attribute, wherein the search request of the user does not include, in the search request, the metadata attribute and associated attribute values returned by the web search engine;

a priority module that prioritizes one or more of the extracted metadata attributes and the attribute values, wherein one or more of:

the metadata attributes are prioritized based on a number of times attribute values of each metadata attribute occurs in the results list, wherein the metadata attributes are organized so a metadata attribute with a largest number of attribute value occurrences is displayed first in the display of metadata attributes to the user; and the metadata attributes are prioritized based on a number of occurrences for each metadata attribute and wherein presenting the metadata attributes to the user further comprises presenting a subset of metadata attributes to the user, the subset comprising metadata attributes occurring most often in the results list;

a metadata attribute presentation module that presents the prioritized extracted metadata attributes to a user for selection by the user, the prioritized extracted metadata attributes presented to the user on a portion of an electronic display displaying the web search results;

a metadata attribute receiving module that receives input from the user indicating a selected metadata attribute of the metadata attributes;

an attribute value presentation module that presents attribute values associated with the selected metadata attribute to the user for selection by the user, the extracted attribute values of the selected metadata attribute are presented to the user on a portion of an electronic display displaying the web search results;

an attribute value receiving module that receives input from the user indicating a selected attribute value of the attribute values associated with the selected metadata attribute;

a filter module that filters the web search results based on the selected attribute value, wherein each entry in the filtered web search results comprises the selected attribute value; and a results display module that displays a filtered results list to the user, the filtered results list comprising the filtered web search results, wherein at least a portion of the extraction module, the metadata attribute presentation module, the metadata attribute receiving module, the attribute value presentation module, the attribute value receiving module, the filter module and the results display module comprise one or more of hardware and executable code, the executable code stored on one or more non-transitory computer readable storage media.

11. The apparatus of claim 10, wherein the selected metadata attribute comprise a first selected metadata attribute, the selected attribute value comprises a first selected attribute value, the filtered web search results comprise first filtered web search results, and displaying the filtered results list comprises displaying a first filtered results list, the metadata attribute receiving module further receives input from the user indicating a second selected metadata attribute of the metadata attributes, the attribute value receiving module further receives input from the user indicating a second selected attribute value, the filter module filters the first filtered web search results based on the second selected attribute value to create second filtered web search results and the results display module displays a second filtered results list to the user, the second filtered results list comprising the second filtered web search results.

12. The apparatus of claim 10, further comprising a tree display module that displays a display object of an expandable tree structure in response to receiving the web search results and receives a selection of the display object of the expandable tree structure from the user, wherein the metadata attribute presentation module presents the extracted metadata attributes to the user in response to the tree display module receiving the selection of the display object from the user.

13. The apparatus of claim 12, wherein the attribute values are presented as child display objects of the display object in the expandable tree structure in response to the metadata attribute receiving module receiving input from the user indicating the selected metadata attribute, the attribute values presented as child display objects associated with the selected metadata attribute.

14. The apparatus of claim 10, wherein the metadata attribute presentation module further presents unselected metadata attributes in response to the attribute value receiving module receiving input from the user indicating a selection of a child display object, the unselected metadata attributes comprising metadata attributes not associated with the selected child display object and not associated with a parent display object of the selected child display object.

15. The apparatus of claim 10, the apparatus further comprising a priority module that prioritizes one of the metadata attributes and the attribute values based on a number of occurrences in the results list.

16. The apparatus of claim 15, wherein the metadata attribute presentation module presents a subset of metadata attributes to the user, the subset comprising metadata attributes which were most highly prioritized by the priority module.

17. A computer program product for filtering search results, the computer program product comprising a non-transitory computer readable storage medium having computer readable program code embodied therewith, the computer readable program code comprising computer readable program code configured for:

extracting metadata attributes and associated attribute values from web search results, the web search results returned in response to a search request submitted by a user from a computer of the user to a web search engine, the search request comprising search criteria input by the user to the search engine, the search request input by the user using a user interface to the computer, the web search results comprising entries organized into a results list, each entry comprising data extracted from a data object searched by the web search engine and meeting the search criteria, the metadata attributes and associated attribute values extracted from the data objects corresponding to the entries of the results list, each metadata attribute comprising one or more associated attribute values, each metadata attribute comprising a category, each associated attribute value comprising value that corresponding to an associated metadata attribute, wherein the search request of the user does not include, in the search request, the metadata attribute and associated attribute values returned by the web search engine;

prioritizing one or more of the extracted metadata attributes and the attribute values, wherein one or more of:

the metadata attributes are prioritized based on a number of times attribute values of each metadata attribute occurs in the results list, wherein the metadata attributes are organized so a metadata attribute with a largest number of attribute value occurrences is displayed first in the display of metadata attributes to the user; and the metadata attributes are prioritized based on a number of occurrences for each metadata attribute and wherein presenting the metadata attributes to the user further comprises presenting a subset of metadata attributes to the user, the subset comprising metadata attributes occurring most often in the results list;

presenting the prioritized extracted metadata attributes to a user for selection by the user, the prioritized extracted metadata attributes presented to the user on a portion of an electronic display displaying the web search results;

receiving input from the user indicating a selected metadata attribute of the metadata attributes;

presenting attribute values associated with the selected metadata attribute to the user for selection by the user, the extracted attribute values of the selected metadata attribute are presented to the user on a portion of an electronic display displaying the web search results;

receiving input from the user indicating a selected attribute value of the attribute values associated with the selected metadata attribute;

filtering the web search results based on the selected attribute value, wherein each entry in the filtered web search results comprises the selected attribute value; and
displaying a filtered results list to the user, the filtered results list comprising the filtered web search results.

* * * * *